(12) United States Patent
Yoshida et al.

(10) Patent No.: US 10,668,881 B2
(45) Date of Patent: Jun. 2, 2020

(54) COLLISION DETECTION DEVICE FOR VEHICLE

(71) Applicant: TOYOTA JIDOSHA KABUSHIKI KAISHA, Toyota-shi, Aichi-ken (JP)

(72) Inventors: Tomokazu Yoshida, Kariya (JP); Takatoshi Tanabe, Kariya (JP); Daisuke Nakane, Kariya (JP); Kota Amano, Kariya (JP); Naoya Higashimachi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 40 days.

(21) Appl. No.: 16/068,785

(22) PCT Filed: Jan. 7, 2017

(86) PCT No.: PCT/JP2017/000351
§ 371 (c)(1),
(2) Date: Jul. 9, 2018

(87) PCT Pub. No.: WO2017/122598
PCT Pub. Date: Jul. 20, 2017

(65) Prior Publication Data
US 2019/0023206 A1    Jan. 24, 2019

(30) Foreign Application Priority Data

Jan. 11, 2016 (JP) .................. 2016-003132

(51) Int. Cl.
*B60R 19/48* (2006.01)
*B60R 21/0136* (2006.01)
(Continued)

(52) U.S. Cl.
CPC .......... *B60R 19/483* (2013.01); *B60R 19/023* (2013.01); *B60R 21/0136* (2013.01);
(Continued)

(58) Field of Classification Search
CPC . B60R 19/483; B60R 21/0136; B60R 19/023; G01L 5/0052
(Continued)

(56) References Cited

U.S. PATENT DOCUMENTS 7,607,705 B1 * 10/2009 Mast ..................... B60R 19/483
293/102
2005/0200139 A1 * 9/2005 Suzuki ................ B60R 21/0136
293/117
(Continued)

FOREIGN PATENT DOCUMENTS

DE    202011105867 U1    10/2011
DE    102014114651         5/2015
(Continued)

OTHER PUBLICATIONS

Written Opinion for PCT/JP2017/000351, dated Jul. 17, 2018, in 5 pages.
(Continued)

*Primary Examiner* — Jason S Morrow
(74) *Attorney, Agent, or Firm* — Knobbe, Martens, Olson & Bear, LLP

(57) ABSTRACT

In a collision detection device for a vehicle, the bumper absorber includes general parts and holding parts alternately in a lengthwise direction of the groove portion. In each of the general parts, a predetermined clearance is formed between an inner wall surface of the groove portion on at least one side of vehicle up and down sides, and the detection tube member. Each of the holding parts is in contact with a surface of the detection tube member on at least one side of vehicle up and down sides, and vehicle front and rear sides to hold the detection tube member. A holding part ratio, which is a ratio of a part of the detection tube member held
(Continued)

by the holding parts to a unit length of the detection tube member, is set to be smaller than a predetermined value.

14 Claims, 9 Drawing Sheets

(51) Int. Cl.
*B60R 19/02* (2006.01)
*G01L 5/00* (2006.01)
*B60R 21/00* (2006.01)

(52) U.S. Cl.
CPC ...... *G01L 5/0052* (2013.01); *B60R 2021/003* (2013.01); *B60Y 2400/306* (2013.01)

(58) Field of Classification Search
USPC ................................................ 293/4, 117
See application file for complete search history.

(56) References Cited

U.S. PATENT DOCUMENTS

| | | | | |
|---|---|---|---|---|
| 2006/0131898 | A1* | 6/2006 | Shoji | B60R 19/483 293/4 |
| 2008/0060450 | A1 | 3/2008 | Bischoff et al. | |
| 2009/0019940 | A1* | 1/2009 | Suzuki | B60R 19/483 73/800 |
| 2009/0322107 | A1 | 12/2009 | Takahashi et al. | |
| 2014/0050438 | A1* | 2/2014 | Hwang | G01D 5/35303 385/13 |
| 2015/0274119 | A1* | 10/2015 | Schondorf | B60R 19/483 293/132 |
| 2016/0039376 | A1* | 2/2016 | Narita | B60R 19/483 293/4 |
| 2017/0043735 | A1* | 2/2017 | Yamaguchi | B60R 19/483 |
| 2017/0225637 | A1* | 8/2017 | Kamimura | B60R 19/18 |
| 2017/0274850 | A1* | 9/2017 | Aizawa | B60R 19/18 |
| 2018/0141515 | A1* | 5/2018 | Feeser | B60R 19/483 |
| 2018/0265024 | A1* | 9/2018 | Syvertsen | B60R 19/023 |
| 2018/0272971 | A1* | 9/2018 | Syvertsen | B60R 19/483 |
| 2019/0023206 | A1* | 1/2019 | Yoshida | B60R 19/48 |
| 2019/0061661 | A1* | 2/2019 | Stanek | B60R 19/22 |

FOREIGN PATENT DOCUMENTS

| | | |
|---|---|---|
| EP | 2017137 | 1/2009 |
| JP | 5509863 | 7/2011 |
| JP | 2014-505629 A | 3/2014 |
| JP | 2016-020133 | 2/2016 |
| JP | 2016-027966 A | 2/2016 |

OTHER PUBLICATIONS

International Search Report for EU Application No. 17738352.8, dated Sep. 13, 2018.
Search Report and Written Opinion in International Application No. PCT/JP2017/000351 dated Mar. 21, 2017 in 7 pages.

* cited by examiner

HOLDING PART RATIO : 10%

HOLDING PART RATIO : 30%

HOLDING PART RATIO : 10%

HOLDING PART RATIO : 30%

COLLISION DETECTION DEVICE FOR VEHICLE

CROSS REFERENCE TO RELATED APPLICATION

This application is based on Japanese Patent Application No. 2016-3132 filed on Jan. 11, 2016, the disclosure of which is incorporated herein by reference.

TECHNICAL FIELD

The present disclosure relates to a collision detection device for a vehicle for detecting a collision of the vehicle with a pedestrian or the like.

BACKGROUND ART

Conventionally, there is a vehicle including a pedestrian protection device for reducing an impact on a pedestrian when the pedestrian collides with the vehicle. This vehicle includes at its bumper part a collision detection device with a sensor. The vehicle is configured to, if this sensor detects a collision of a pedestrian or the like with the vehicle, activate the pedestrian protection device, mitigating an impact on the pedestrian. There is a device called a pop-up hood, for example, for this pedestrian protection device. At the time of vehicle collision detection, this pop-up hood lifts the rear end of an engine hood to increase a clearance between the pedestrian and a hard component such as an engine, and absorbs the energy of the collision with the pedestrian's head using this space to reduce the impact on the head.

The above-described collision detection device for a vehicle may be configured such that a chamber member having therein chamber space is placed on the front surface of a bumper reinforcement in the bumper of the vehicle and that the pressure in this chamber space is detected by a pressure sensor. According to the device having this configuration, if an object such as a pedestrian collides with a bumper cover, the chamber member is deformed due to a deformation of the bumper cover to make a pressure change in the chamber space. Through the detection of this pressure change by the pressure sensor, the collision detection device detects the collision of the pedestrian.

Recently, there has been proposed a tube-type collision detection device for a vehicle that detects a collision using a tube member, which is smaller in size and better in installability than the chamber-type collision detection device for a vehicle described above. This collision detection device for a vehicle is configured to include a bumper absorber that is a member for impact absorption placed in a bumper of the vehicle, a hollow tube member that is attached to the groove portion formed on the bumper absorber along the vehicle width direction, and a pressure sensor that detects a pressure in the tube member. If a pedestrian or the like collides with the vehicle front, the bumper absorber is deformed, absorbing the impact, and at the same time the tube member is also deformed. In this case, the pressure in the tube member rises, and the collision detection device detects the collision of the vehicle with the pedestrian based on the detection of this pressure change by the pressure sensor.

PRIOR ART DOCUMENT

Patent Document

Patent Document 1: JP 2014-505629 A

For the above-configured collision detection device for a vehicle to satisfy the pressure characteristics required for detection of the pedestrian collision, sufficient clearances need to exist on vehicle upper and lower sides of the tube member in the groove portion of the bumper absorber so that the tube member can be properly deformed at the time of collision occurrence. On the other hand, there is an issue that, if the clearance between the groove portion and the tube member is too large, the tube member may be not reliably held by the groove portion to be separated.

SUMMARY OF INVENTION

The present disclosure addresses the issues described above. Thus, it is an objective of the present disclosure to provide a collision detection device for a vehicle that gives clearances on vehicle upper and lower sides of a detection tube member in a groove portion of a bumper absorber to accomplish both ensuring of pressure characteristics and ensuring of holding strength for the detection tube member.

To achieve the objective, a collision detection device for a vehicle in an aspect of the present disclosure includes a bumper absorber that is placed on a vehicle front side of a bumper reinforcement in a bumper of the vehicle, a detection tube member that is attached to a groove portion formed on a rear surface of the bumper absorber along a vehicle width direction and that includes therein a hollow part, a pressure sensor that detects a pressure in the hollow part of the detection tube member, and a collision detection part that detects a collision of an object (i.e., pedestrian) with the bumper based on a result of the pressure detection by the pressure sensor. The bumper absorber includes general parts and holding parts alternately in a lengthwise direction of the groove portion. In each of the general parts, a predetermined clearance is formed between an inner wall surface of the groove portion on at least one side of vehicle up and down sides, and the detection tube member. Each of the holding parts is in contact with a surface of the detection tube member on at least one side of vehicle up and down sides, and vehicle front and rear sides to hold the detection tube member. A holding part ratio, which is a ratio of a part of the detection tube member held by the holding parts to a unit length of the detection tube member, is set to be smaller than a predetermined value.

In the general part of the bumper absorber, a predetermined clearance is formed between the inner wall surface of the groove portion on at least one side of the vehicle up and down sides and the detection tube member. Thus, this configuration can appropriately deform the detection tube member at the time of the collision of the vehicle with a pedestrian to prevent the accuracy deterioration of collision detection by the collision detection device for a vehicle. The holding part, which is in contact with the surface of the detection tube member on at least one side of the vehicle up and down sides, and the vehicle front and rear sides to hold the detection tube member, is provided at the groove portion of the bumper absorber. Consequently, the detection tube member can be prevented from dropping off the groove portion to improve the holding strength for the detection tube member. The general parts and the holding parts are arranged alternately in the lengthwise direction of the groove portion, and the holding part ratio, which is a ratio of the part of the detection tube member held by the holding parts to the unit length of the detection tube member, is set to be lower than a predetermined value. Consequently, this configuration can accomplish both ensuring of pressure characteristics of the collision detection device for a vehicle and ensuring of the holding strength for the detection tube member.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
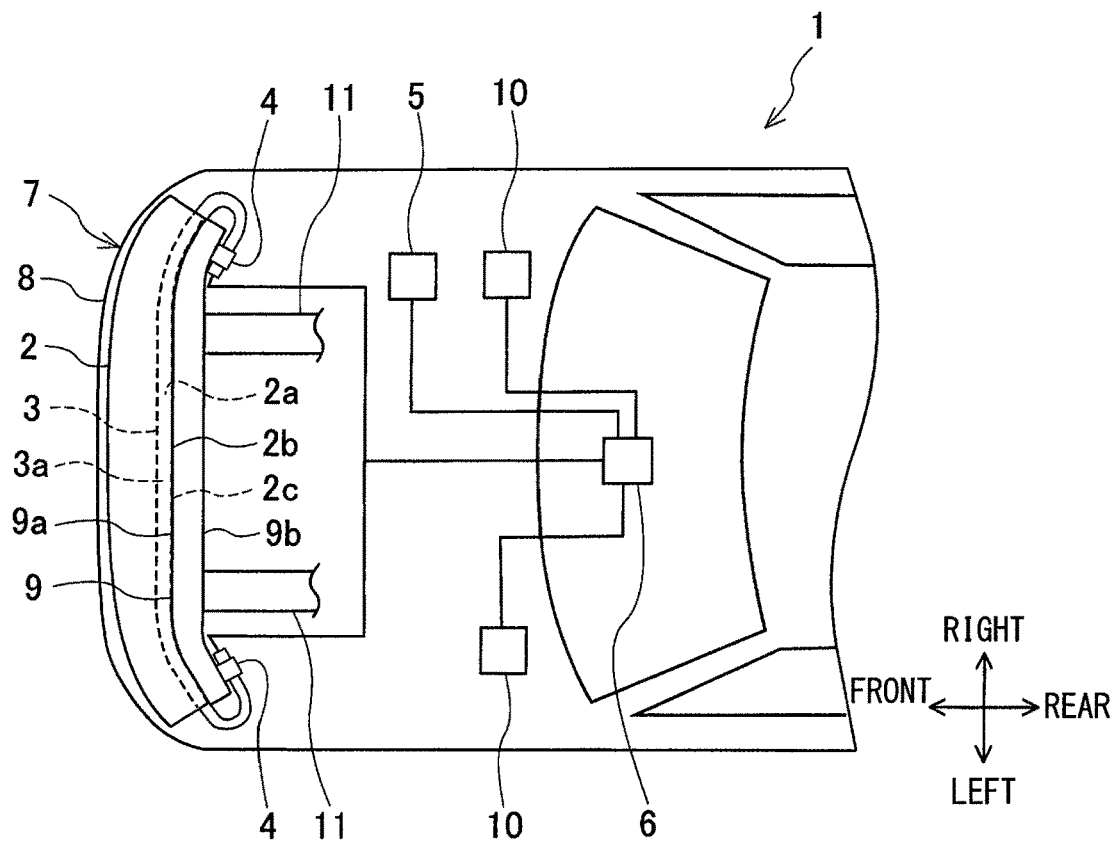
FIG. 1 is a diagram illustrating an entire configuration of a collision detection device for a vehicle in accordance with a first embodiment.
Figure 2:
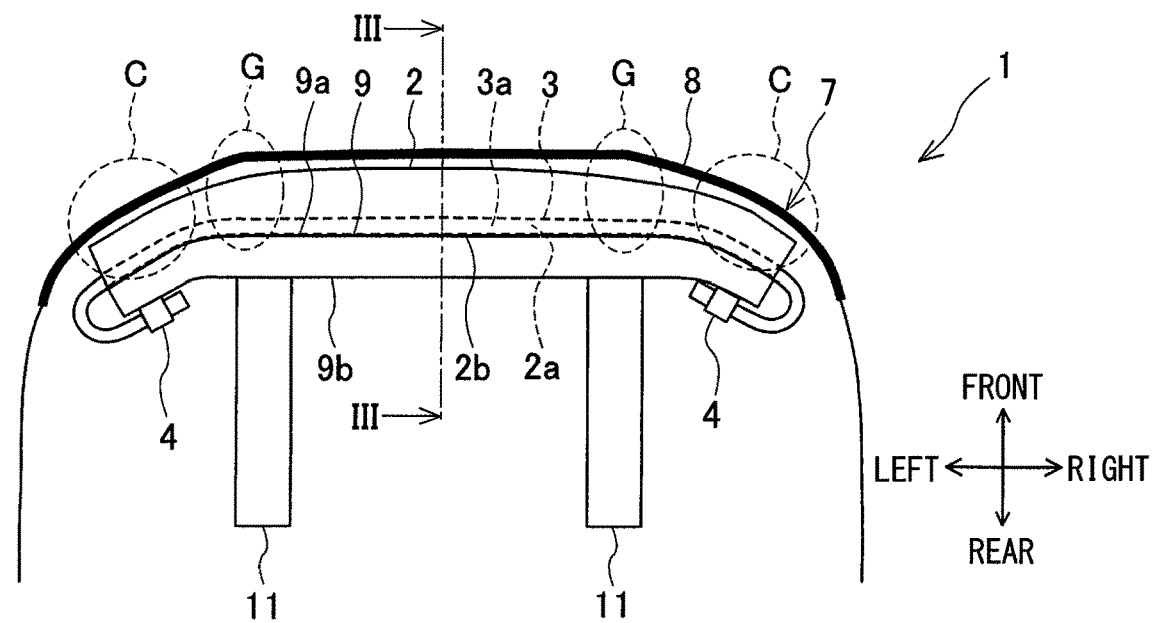
FIG. 2 is an enlarged view of a bumper part in FIG. 1.
Figure 3:
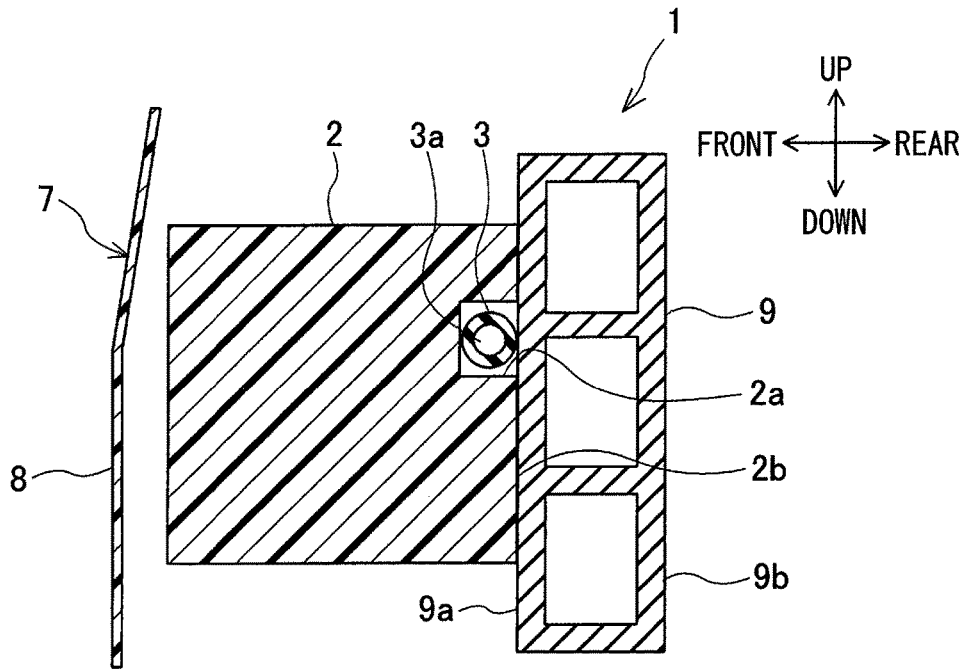
FIG. 3 is a sectional view taken along a line in FIG. 2.

A collision detection device for a vehicle in a first embodiment will be described below with reference to FIGS. 1 to 9. As illustrated in FIGS. 1 and 2, a collision detection device 1 for a vehicle of the present embodiment is configured to include a bumper absorber 2 that is a member for impact absorption, a hollow detection tube member 3, a pressure sensor 4, a speed sensor 5, and a collision detection ECU 6 (corresponding to a collision detection part). This collision detection device 1 for a vehicle detects a collision of an object such as a pedestrian with a bumper 7 provided on a vehicle front side. As illustrated in FIG. 3, this bumper 7 mainly includes a bumper cover 8, the bumper absorber 2, and a bumper reinforcement 9.

As illustrated in FIG. 3, the bumper absorber 2 is placed on a front surface 9a of the bumper reinforcement 9 (i.e., on a vehicle front side). This bumper absorber 2 is a member having a function of impact absorption in the bumper 7, and is made of, for example, polypropylene foam.

Figure 4:
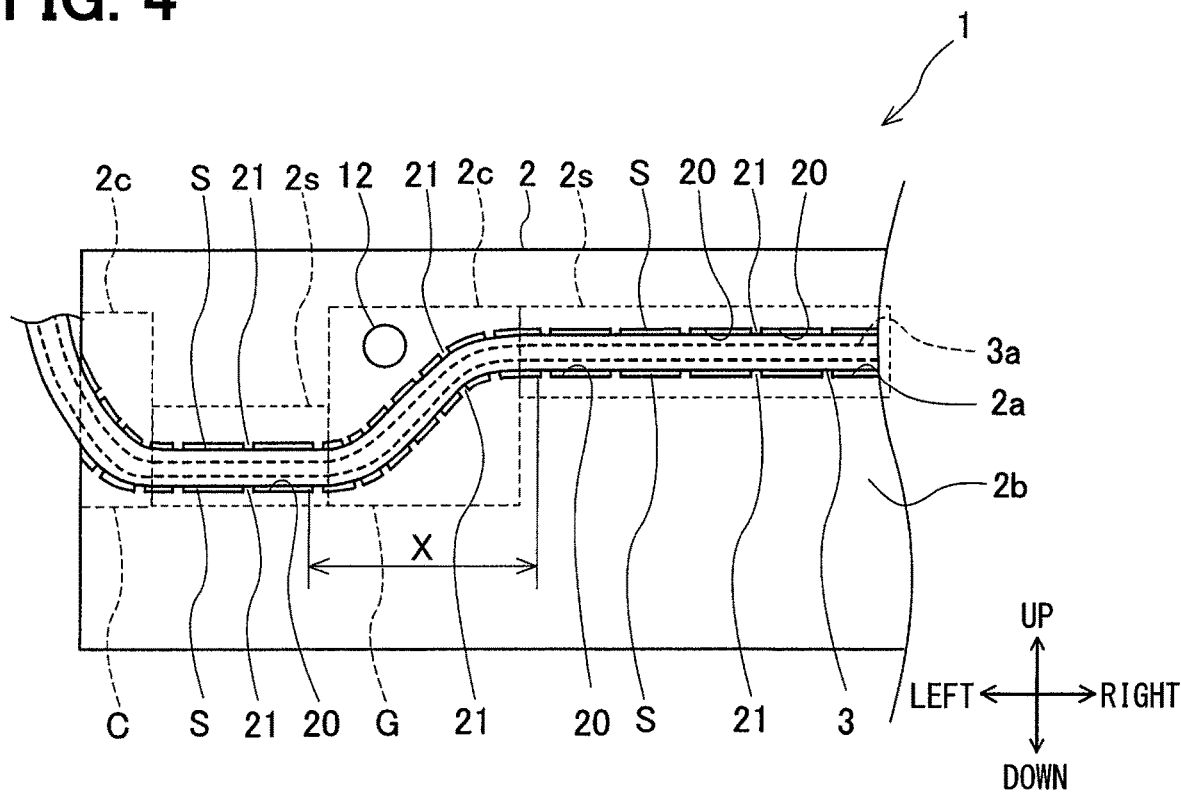
FIG. 4 is a diagram illustrating a generally left half of a bumper absorber in FIG. 2 viewed from a vehicle rear side.

A groove portion 2a, to which the detection tube member 3 is attached, is formed on a rear surface 2b of the bumper absorber 2 along the vehicle width direction. As illustrated in FIG. 4, the groove portion 2a of the present embodiment is configured to include a straight part 2s extending in the vehicle horizontal direction to have a straight shape, and a curved part 2c having a curved shape that is bent from the straight part 2s in the vehicle up-down direction. Specifically, the curved part 2c is curved to the vehicle down side to avoid a binding hook 12 that is attached on the front surface 9a of the bumper 16 reinforcement 9 at a front grille end portion G, and is curved to the vehicle up side at a corner portion C of the bumper cover 8.

Figure 5:
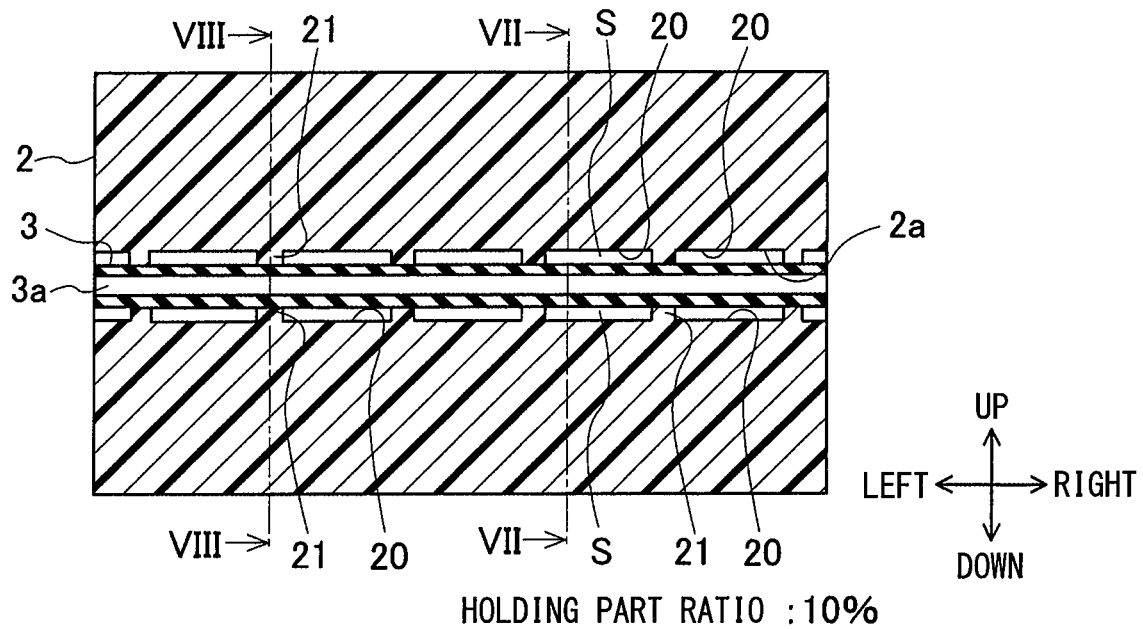
FIG. 5 is an enlarged sectional view illustrating a straight part of a groove portion in FIG. 4.
Figure 6:
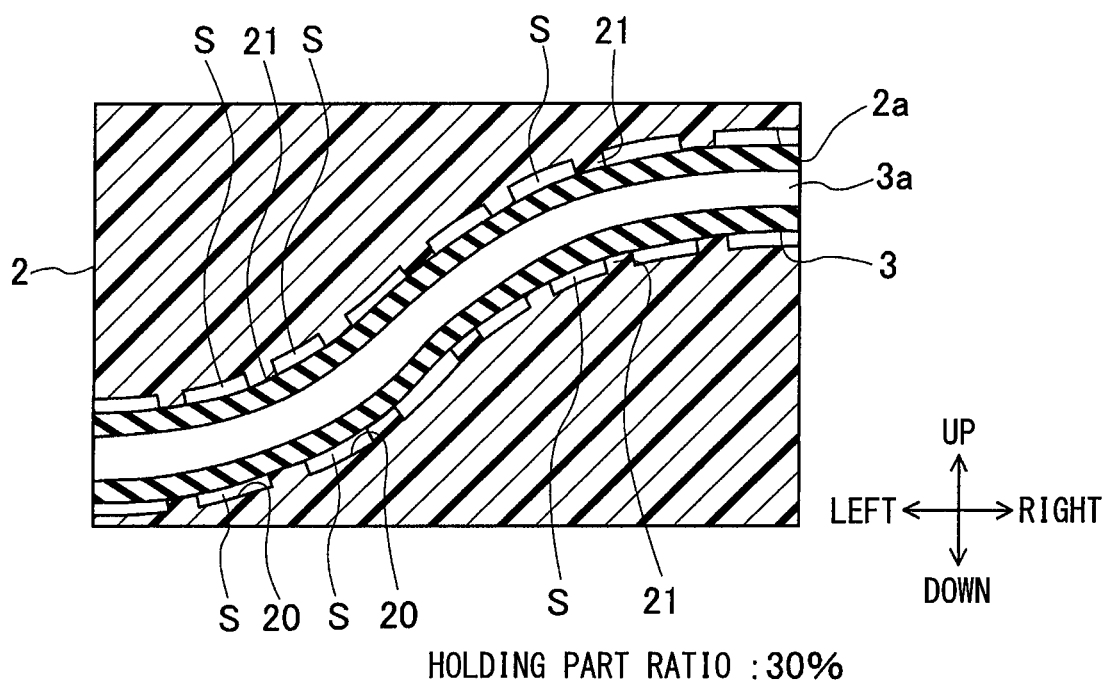
FIG. 6 is an enlarged sectional view illustrating a curved part of the groove portion in FIG. 4.
Figure 7:
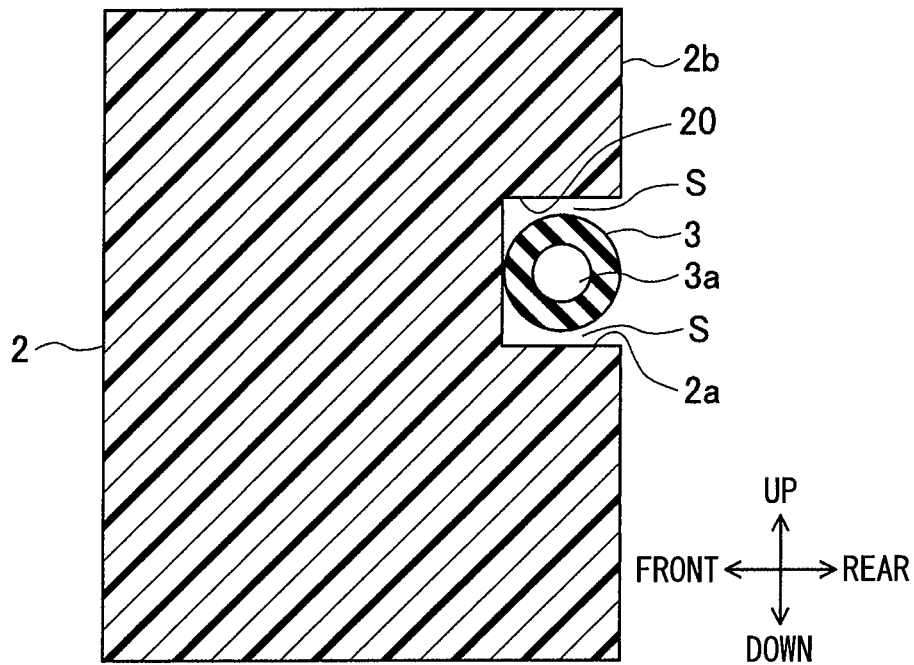
FIG. 7 is a sectional view taken along a line VII-VII in FIG. 5.
Figure 8:
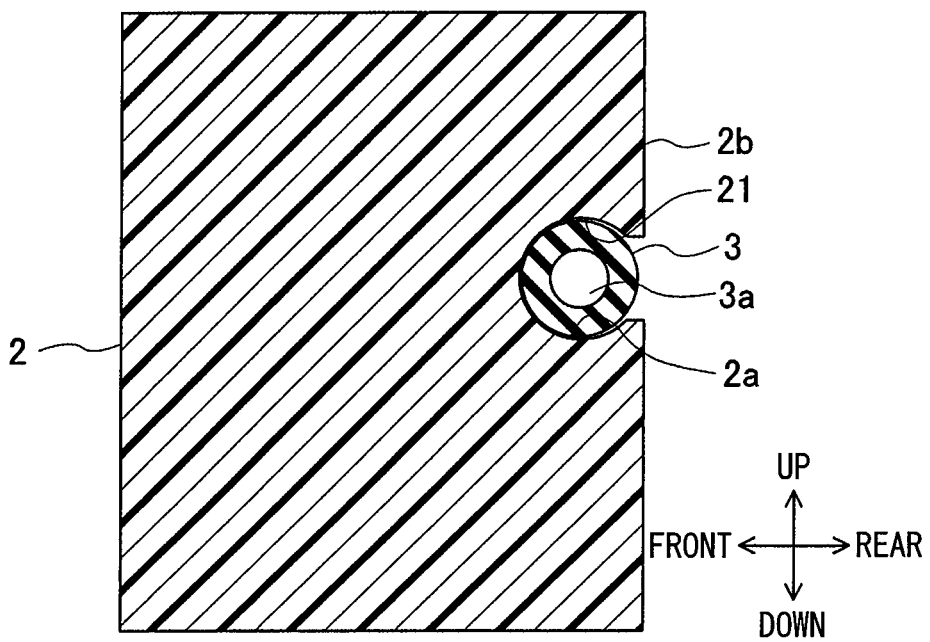
FIG. 8 is a sectional view taken along a line VIII-VIII in FIG. 5.

As illustrated in FIGS. 5 and 6, this groove portion 2a, general parts 20 and holding parts 21 are provided alternately in the lengthwise direction of the groove portion 2a. In the general part 20, predetermined clearances S are formed between the inner wall surface of the groove portion 2a on the vehicle up and down sides, and the detection tube member 3, as illustrated in FIG. 7. The length of each clearance S in the up-down direction is, for example, approximately 1 mm. As illustrated in FIG. 8, the holding part 21 is in contact with the outer peripheral surface of the detection tube member 3 (i.e., with the vehicle up, down, and front side surfaces of the member 3, excluding a predetermined range on the vehicle rear side surface of the member 3 located on the up, down and central sides), so that the detection tube member 3 is held by the holding part 21. The size of the clearance S can be set appropriately so according to its position in the vehicle width direction.

The holding parts 21 are a pair of projections that are molded integrally with the bumper absorber 2 and that project opposed to each other from the up and down open ends of the groove portion 2a. The holding part 21 has a length of approximately several millimeters in the vehicle width direction. The holding parts 21 are arranged at intervals different according to their positions in the vehicle width direction. Specifically, at the straight part 2s of the groove portion 2a illustrated in FIG. 5, the interval between the holding parts 21 in the vehicle width direction is set at, for example, 100 mm. On the other hand, at the curved part 2c of the groove portion 2a illustrated in FIG. 6, the interval between the holding parts 21 in the vehicle width direction is set to be narrower than the interval at the straight part 2s.

In the present embodiment, a holding part ratio, which is a ratio of the part of the detection tube member 3 held by the holding parts 21 to the unit length X of the detection tube member 3, is set to be smaller than a predetermined value, i.e., smaller than 40%. The unit length X is set to be 300 mm to 400 mm. This is because the length of the bumper cover 8 in the vehicle width direction that is deformed due to the collision of a leg impactor simulating a pedestrian's leg during the collision test assuming a pedestrian collision with the vehicle bumper, is assumed to be 300 mm to 400 mm. More specifically, at least one part of the parts of the detection tube member 3 that are deformed at the time of collision is held by the holding part 21, and the holding part ratio to the unit length X of the detection tube member 3 at an arbitrary position in its lengthwise direction is set to be smaller than 40%. Consequently, the detection tube member 3 is not removed from the groove portion 2a and the detection tube member 3 is properly deformed at the time of collision.

Specifically, the holding part ratio is set to be small at the straight part 2s of the groove portion 2a illustrated in FIG. 5. In this case, the holding part ratio at the straight part 2s is set to be approximately 10%. On the other hand, the holding part ratio is set to be large at the curved part 2c of the groove portion 2a illustrated in FIG. 6. In this case, the holding part ratio at the curved part 2c is set to be approximately 30%. At such a curved part 2c, the detection tube member 3 is removed easily from the inside of the groove portion 2a, and the holding part ratio is thus set to be higher than the other part. In the present embodiment, the holding part ratio is set to be higher than the other portions at the front grille end portion G to which the binding hook 12 is attached, and at the corner portion C where the bumper cover 8 on the end portion side in the vehicle width direction is inclined in the vehicle front-rear direction.

As illustrated in FIGS. 1 and 2, the detection tube member 3 is a member that includes therein a hollow part 3a and extends in the vehicle width direction, i.e., in the vehicle right-left direction. This detection tube member 3 is placed at the position opposed to the front surface 9a of the bumper reinforcement 9 in the bumper 7 of the vehicle, i.e., on the vehicle front side. Both end parts of the detection tube member 3 are bent at the right and left outer sides of the bumper reinforcement 9 in the vehicle width direction to be connected respectively to the pressure sensors 4 described later.

This detection tube member 3 has a circular cross-sectional shape, and is made of synthetic rubber, such as silicone rubber. The outside size of the detection tube member 3 is, for example, approximately 8 mm in outer diameter, and approximately 2 mm in thickness. Alternatively, for example, ethylene propylene rubber (EPDM) may be used for the material of the detection tube member 3. The cross-sectional shape of the detection tube member 3 may be, for example, a quadrangular shape, as well as a circular shape.

As described above, the detection tube member 3 of the present embodiment is attached into the curved part 2c of the groove portion 2a, being bent in the vehicle up-down direction at the front grille end portion G and at the right and left corner portions C of the bumper cover 8. At the other portions, on the other hand, the detection tube member 3 is attached into the straight part 2s of the groove portion 2a, extending in the vehicle horizontal direction.

The pressure sensors 4 are arranged on the vehicle rear side of the front surface 9a of the bumper reinforcement 9. Specifically, two pressure sensors 4 are arranged on both right and left end part sides in the bumper cover 8, and are fastened to a rear surface 9b of the bumper reinforcement 9 by bolts (not shown) or the like to be fixed and attached thereto. The present embodiment arranges the two pressure sensors 4 in this manner to secure redundancy and detection accuracy.

As illustrated in FIG. 2, these pressure sensors 4 are configured to be connected respectively to both right and left end parts of the detection tube member 3, to detect the pressure in the hollow part 3a of the detection tube member 3. Specifically, the pressure sensor 4 is a sensor device that detects a pressure change of gas, and detects a pressure change of air in the hollow part 3a of the detection tube member 3. As illustrated in FIG. 1, the pressure sensor 4 is electrically connected to the collision detection electronic control unit (ECU) 6 via a transmission line to output a signal proportional to the pressure to the collision detection ECU 6. Based on the result of a pressure detection by the pressure sensor 4, the collision detection ECU 6 detects a collision of a pedestrian with the bumper 7. The collision detection ECU 6 is electrically connected to pedestrian protection devices 10.

The speed sensor 5 is a sensor device that detects a vehicle speed, and is electrically connected to the collision detection ECU 6 via a signal line. This speed sensor 5 transmits a signal proportional to the vehicle speed to the collision detection ECU 6.

The collision detection ECU 6 includes mainly a CPU, and controls the entire operation of the collision detection device 1 for a vehicle. As illustrated in FIG. 1, the collision detection ECU 6 is electrically connected to each of the pressure sensors 4, the speed sensor 5, and the pedestrian protection devices 10. A pressure signal from the pressure sensor 4, a speed signal from the speed sensor 5 and so forth are inputted into the collision detection ECU 6. Based on the pressure signal from the pressure sensor 4 and the speed signal from the speed sensor 5, the collision detection ECU 6 executes predetermined collision determination processing, and upon detection of the collision of an object such as a pedestrian with the bumper 7, activates the pedestrian protection device 10.

The bumper 7 is for mitigating an impact at the time of vehicle collision and includes the bumper cover 8, the bumper absorber 2, and the bumper reinforcement 9. The bumper cover 8 is provided to cover the component parts of the bumper 7, and is a member made of resin such as polypropylene. This bumper cover 8 constitutes the exterior appearance of the bumper 7 and at the same time constitutes a part of the exterior appearance of the entire vehicle. Although not shown, a hole part, through which the later-described binding hook 12 is inserted, is provided at the bumper cover 8.

The bumper reinforcement 9 is a rigid member that is placed in the bumper cover 8 to extend in the vehicle width direction and that is made of metal such as aluminum, and is a hollow member having a B-shaped cross section beamed at the center in the reinforcement 9 as illustrated in FIG. 3. The bumper reinforcement 9 includes the front surface 9a which is a vehicle front side surface, and the rear surface 9b which is a vehicle rear side surface. As illustrated in FIGS. 1 and 2, this bumper reinforcement 9 is attached to the front ends of side members 11 which are a pair of metal members extending in the vehicle front-rear direction.

Although not shown, fitted parts are provided respectively for the bumper absorber 2 and the bumper reinforcement 9, and these fitted parts are fitted together to attach the bumper absorber 2 to the bumper reinforcement 9.

The binding hook 12 is also called a towing hook and is used when towing away the vehicle due to a vehicle accident, a vehicle trouble or the like. Although not shown, the binding hook 12 includes a male screw portion at its one end part and a loop portion through which to pass a rope at the other end part. FIG. 4 illustrates the cross section of the binding hook 12. Normally, the so binding hook 12 is separated from the vehicle and is stored in, for example, a toolbox of the vehicle.

Normally, the vehicle collision accident often involves a collision with a pedestrian or a vehicle located on the front side of the vehicle, which is a traveling direction of the vehicle. For this reason, the present embodiment arranges the pressure sensors 4 on the rear surface 9b of the bumper reinforcement 9 to protect by the presence of the bumper reinforcement 9 the direct transmission of an impact accompanying the collision with a pedestrian or a vehicle on the front side of the vehicle from the bumper cover 8 or the like provided on the vehicle front side to the pressure sensors 4.

For example, a pop-up hood is used for the pedestrian protection device 10. This pop-up hood lifts the rear end of an engine hood instantaneously upon detection of a vehicle collision to increase a clearance between the pedestrian and a hard component such as an engine, and absorbs the energy of the collision with the pedestrian's head using this space to reduce the impact on the pedestrian's head. For example, a cowl airbag that deploy an airbag from the upper part of the engine hood outside the vehicle body to the lower part of a windshield to buffer the impact on the pedestrian may be used instead of the pop-up hood.

The operation of the collision detection device 1 for a vehicle of the present embodiment at the time of a collision will be described. When an object such as a pedestrian collides with the vehicle front side, the bumper cover 8 of the bumper 7 deforms due to an impact by the collision with the pedestrian. Then, the bumper absorber 2 is deformed, absorbing the impact, and at the same time the detection tube member 3 is also deformed. In this case, the pressure in the detection tube member 3 rapidly rises, and this pressure change is transmitted to the pressure sensor 4.

In the general part 20 of the bumper absorber 2 of the present embodiment, the predetermined clearances S are formed between the inner wall surfaces of the groove portion 2a on the vehicle up and down sides, and the detection tube member 3. This can appropriately deform the detection tube member 3, accompanying the deformation of the bumper absorber 2. More specifically, forming the predetermined clearances S on the vehicle up and down sides of the detection tube member 3 can swell the detection tube member 3 properly to the vehicle up and down sides in the groove portion 2a at the time of the collision to crush completely the detection tube member 3 in the vehicle front-rear direction.

Providing the holding parts 21 that hold the detection tube member 3 at the groove portion 2a of the bumper absorber 2, in contact with the surfaces of the detection tube member 3 on the vehicle up and down sides, prevents the detection tube member 3 from falling out of the groove portion 2a at the time of the collision. Moreover, setting the holding part ratio, which is a ratio of the part of the detection tube member 3 held by the holding parts 21 to the unit length X of the detection tube member 3, to be lower than 40% can achieve both ensuring of the output of the pressure sensor 4 and ensuring of the holding strength for the detection tube member 3.

Figure 9:
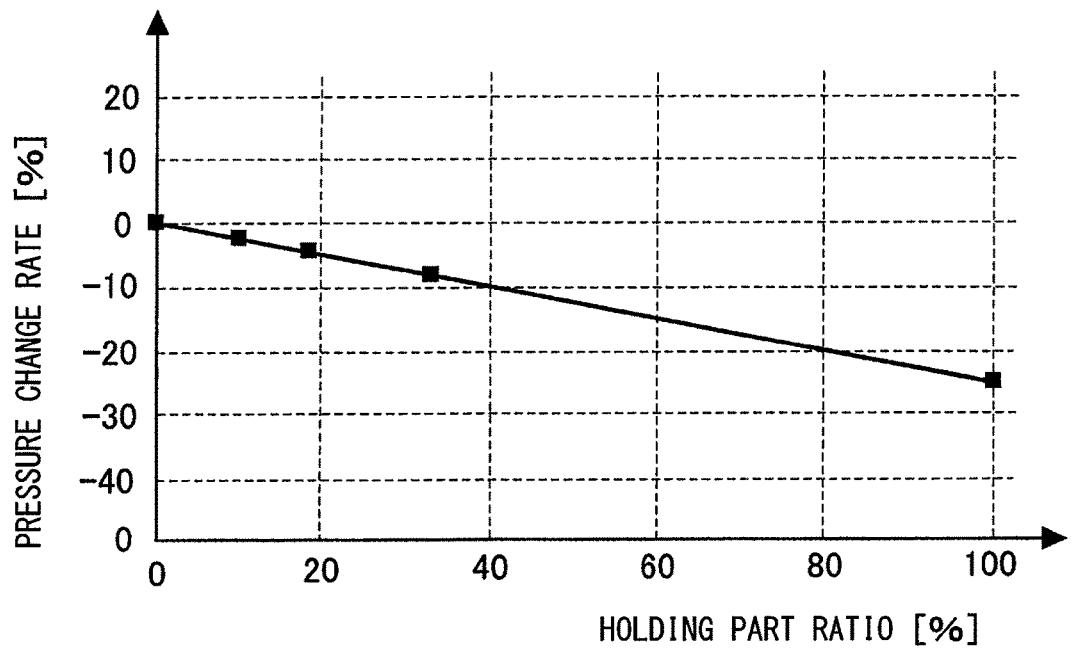
FIG. 9 is a graph indicating a relationship between a holding part ratio and a pressure change rate of a pressure detection value detected by a pressure sensor according to the first embodiment.

Specifically, as the holding part ratio becomes higher, the pressure change rate of a pressure detection value detected by the pressure sensor 4 at the time of the collision becomes lower as illustrated in FIG. 9. This is because, when the holding part ratio is made high, the detection tube member 3 becomes difficult to deform at the time of the collision, so that the output of the pressure sensor 4 becomes small. To secure the output of the pressure sensor 4, the present embodiment sets the holding part ratio to be lower than 40%. Consequently, the reduction rate of the output of the pressure sensor 4 (i.e., pressure change rate) is prevented from falling below −10% as compared to the output of the pressure sensor 4 without the holding parts 21. This can accomplish both ensuring of pressure characteristics of the collision detection device 1 for a vehicle and ensuring of the holding strength for the detection tube member 3.

Next, based on the detection result of the pressure sensor 4, the collision detection ECU 6 of the collision detection device 1 for a vehicle executes the predetermined collision determination processing. In this collision determination processing, the effective mass of the collision object is calculated based on, for example, the detection results of the pressure sensor 4 and the speed sensor 5, and it is determined that the collision with the pedestrian has occurred if this effective mass is larger than a predetermined threshold value. Moreover, if the vehicle speed is within a predetermined range (e.g., range from 25 km to 55 km per hour), it is determined that the collision with the pedestrian which requires the actuation of the pedestrian protection device 10 has occurred.

The "effective mass" means the mass calculated by use of a relationship between a momentum and an impulse based on the detection value by the pressure sensor 4 at the time of the collision. When the collision between the vehicle and the object has occurred, in the case of the collision object whose mass differs from a pedestrian, the detection value by the pressure sensor 4 is different. For this reason, the types of collision objects can be separated by setting a threshold value between the effective mass of a human body and the mass of the assumed another collision object. This effective mass is calculated by dividing a definite integral value for the pressure value detected by the pressure sensor 4 in a predetermined time by the vehicle speed detected by the speed sensor 5, as expressed in the following equation.

$$M = (\int P(t)dt)/V \quad \text{(equation 1)}$$

"M" denotes the effective mass, "P" denotes the detection value by the pressure sensor 4 in the predetermined time, "t" denotes the predetermined time (e.g., several milliseconds to several tens of milliseconds), and "V" denotes the vehicle speed at the time of the collision detected by the speed sensor 5. In addition, the calculation using an equation $E = \frac{1}{2} \cdot MV^2$ expressing the kinetic energy E of the object which has collided can be employed as the method of calculating the effective mass. In this case, the effective mass is so calculated by $M = 2 \cdot E/V^2$.

If the collision detection ECU 6 determines that the collision with the pedestrian which requires the actuation of the pedestrian protection device 10 has occurred, the ECU 6 outputs a control signal for activating the pedestrian protection device 10 to activate the pedestrian protection device 10, thereby reducing the impact on the pedestrian as described above.

The collision detection device 1 for a vehicle of the first embodiment described above includes the bumper absorber 2 that is placed on vehicle front side of the bumper reinforcement 9 in the bumper 7 of the vehicle, the detection tube member 3 that is attached to the groove portion 2a formed on the rear surface 2b of the bumper absorber 2 along the vehicle width direction and that includes therein the hollow part 3a, the pressure sensor 4 that detects the pressure in the hollow part 3a of the detection tube member 3, and the collision detection ECU 6 as a collision detection part that detects the collision of an object (i.e., pedestrian) with the bumper 7 based on the result of the pressure detection by the pressure sensor 4. At the bumper absorber 2, the general part 20, in which the predetermined clearances S are formed between the inner wall surfaces of the groove portion 2a on the vehicle up and down sides, and the detection tube member 3, and the holding part 21 that is in contact with the surface of the detection tube member 3 on the vehicle up, down and front sides to hold the detection tube member 3 are provided alternately in the lengthwise direction of the groove portion 2a. The holding part ratio, which is a ratio of the part of the detection tube member 3 held by the holding parts 21 to the unit length X of the detection tube member 3, is set to be lower than a predetermined value (i.e., 40%).

In the general part 20 of the bumper absorber 2, a predetermined clearance S is formed between the inner wall surface of the groove portion 2a on at least one side of the vehicle up and down sides and the detection tube member 3. Thus, this configuration can appropriately deform the detection tube member 3 at the time of the collision of the vehicle with a pedestrian to so prevent the accuracy deterioration of collision detection by the collision detection device 1 for a vehicle. The holding part 21, which is in contact with the surface of the detection tube member 3 on at least one side of the vehicle up and down sides, and the vehicle front and rear sides to hold the detection tube member 3, is provided at the groove portion 2a of the bumper absorber 2. Consequently, the detection tube member 3 can be prevented from dropping off the groove portion 2a to improve the holding strength for the detection tube member 3. The general parts 20 and the holding parts 21 are arranged alternately in the lengthwise direction of the groove portion 2a, and the holding part ratio, which is a ratio of the part of the detection tube member 3 held by the holding parts 21 to the unit length X of the detection tube member 3, is set to be lower than a predetermined value (i.e., 40%). This configuration can accomplish both ensuring of pressure characteristics of the collision detection device 1 for a vehicle and ensuring of the holding strength for the detection tube member 3.

The distance between the holding parts 21 is different according to their position in the vehicle width direction. In this configuration, by making the distance between the holding parts 21 different according to their position in the vehicle width direction, for example, by narrowing the distance between the holding parts 21 at the position in the vehicle width direction where the detection tube member 3 is easily removed from the groove portion 2a, the detection tube member 3 can be held efficiently and stably entirely in the vehicle width direction.

At the corner portion C on the end portion side in the vehicle width direction where the bumper 7 is inclined in the vehicle front-rear direction, the holding part ratio is set to be higher than the other portions. In this configuration, by setting the holding part ratio at the corner portion C where the detection tube member 3 is easily removed from the groove portion 2a to be higher than at the other portions, the detection tube member 3 can be held efficiently and stably entirely in the vehicle width direction.

The groove portion 2a includes the straight part 2s having a straight shape and the curved part 2c having a curved shape, and the holding part ratio is set to be higher at the curved part 2c than at the straight part 2s. In this configuration, making the holding part ratio at the curved part 2c higher than at the straight part 2s can reliably improve the holding strength for the detection tube member 3 at the curved part 2c where the detection tube member 3 is easily removed from the groove portion 2a.

The curved part 2c is bent to avoid the binding hook 12 that is attached on the front surface 9a of the bumper reinforcement 9. In this configuration, providing the curved part 2c at the groove portion 2a can attach the detection tube member 3 to the groove portion 2a, avoiding the binding hook 12.

The unit length X is 300 mm to 400 mm. In this configuration, setting the unit length X at the length of the bumper cover 8 in the width direction that is deformed when a pedestrian's leg collides with the bumper cover 8 can adequately set the interval between the holding parts 21, and can reliably prevent the detection tube member 3 from separating at the time of the collision.

The holding parts 21 are molded integrally with the bumper absorber 2. In this configuration, the holding parts 21 molded integrally with the bumper absorber 2 eliminate the need to provide a holding member (e.g., clamp) which is a separate component, and can stably hold the detection tube member 3 in a simple configuration without increasing the number of components.

The holding parts 21 are a pair of projections projecting opposed to each other from the up and down open ends of the groove portion 2a. In this configuration, the holding parts 21, which are a pair of projections projecting opposed to each other from the up and down open ends of the groove portion 2a, can hold the detection tube member 3 from the vehicle up and down sides to stably fix the detection tube member 3 to the groove portion 2a.

Second Embodiment

Figure 10:
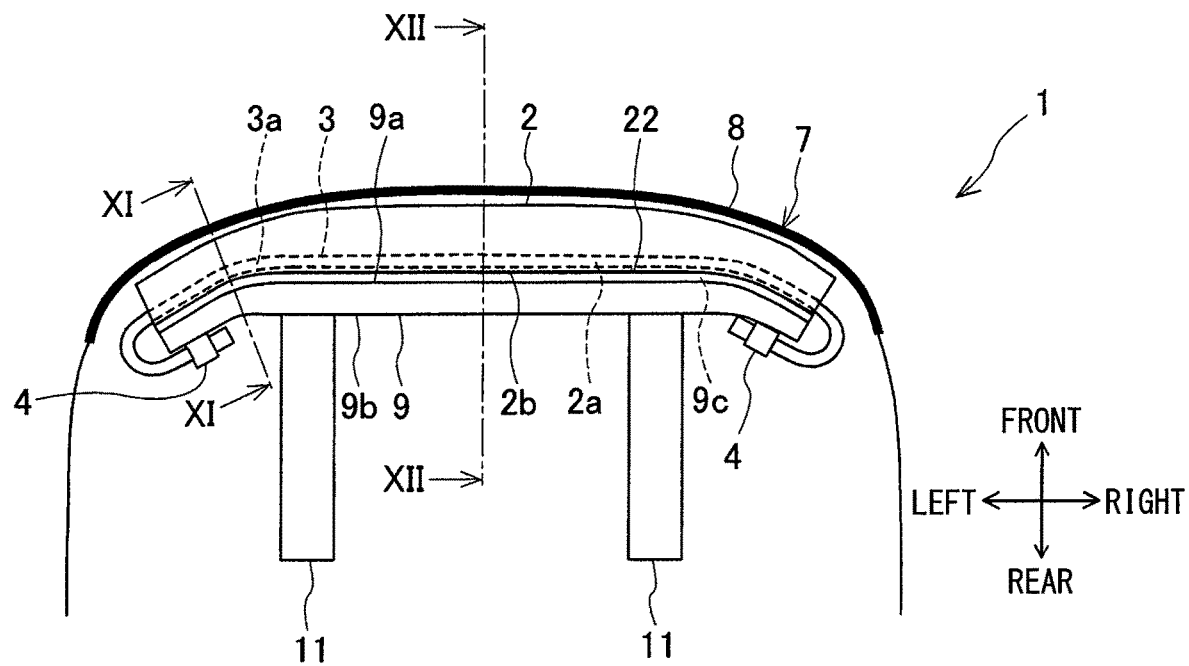
FIG. 10 is a diagram corresponding to FIG. 2 in accordance with a second embodiment.
Figure 11:
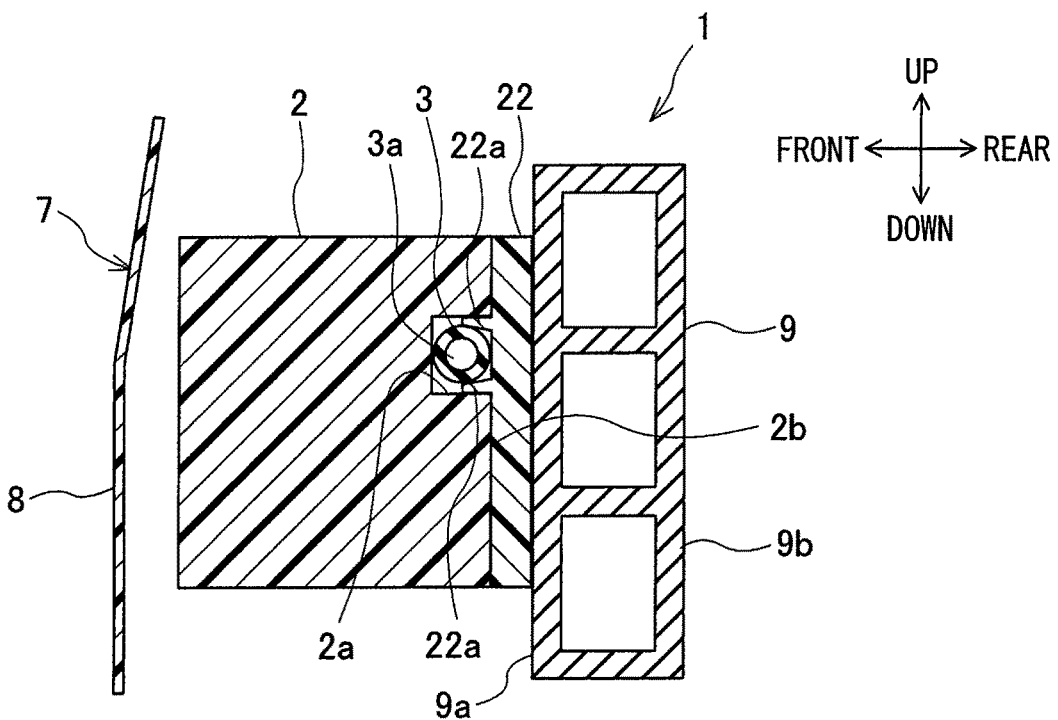
FIG. 11 is a sectional view taken along a line XI-XI in FIG. 10, illustrating a projection portion provided at a holding part.

A second embodiment will be described with reference to FIGS. 10 to 14. To the same part as in the above first embodiment, the same reference numeral is given to omit its description, and only different parts will be explained in FIGS. 10 to 14. As illustrated in FIGS. 10 and 11, the second embodiment provides a rear surface member 22 entirely having a platy shape along the vehicle width direction between a bumper absorber 2 and a bumper reinforcement 9.

This rear surface member 22 is made of a material harder than the bumper absorber 2, for example, a foamed resin with its foaming ratio lower than the bumper absorber 2. After a detection tube member 3 is attached to a groove portion 2a of the bumper absorber 2, the rear surface member 22 is placed on a rear surface 2b of the bumper absorber 2 to close the opening of the groove portion 2a. For example, the bumper absorber 2 and the rear surface member 22 are adhesively fixed together. The rear surface member 22 and the bumper reinforcement 9 are fitted and fixed together by their respective fitted parts (not shown). Alternatively, synthetic resin such as polyethylene or polypropylene may be used for the material of the rear surface member 22.

As illustrated in FIG. 11, the rear surface member 22 includes a pair of projection parts 22a on the up and down sides (corresponding to holding parts). The pair of projection parts 22a on the up and down sides, each including a rectangular sectional shape, project toward the vehicle front side (i.e., toward the detection tube member 3) to be positioned with the detection tube member 3 therebetween. Thus, the distance between the pair of projection parts 22a on the up and down sides in the vehicle up-down direction is set to be approximately equal to the length of the outer diameter of the detection tube member 3. In this case, the distance between the pair of projection parts 22a on the up and down sides is approximately 8 mm. The length of the projection part 22a in its projection direction is approximately 4 mm. Consequently, the pair of projection parts 22a are in contact respectively with the surfaces of the detection tube member 3 on the vehicle up and down sides to hold the detection tube member 3.

Figure 12:
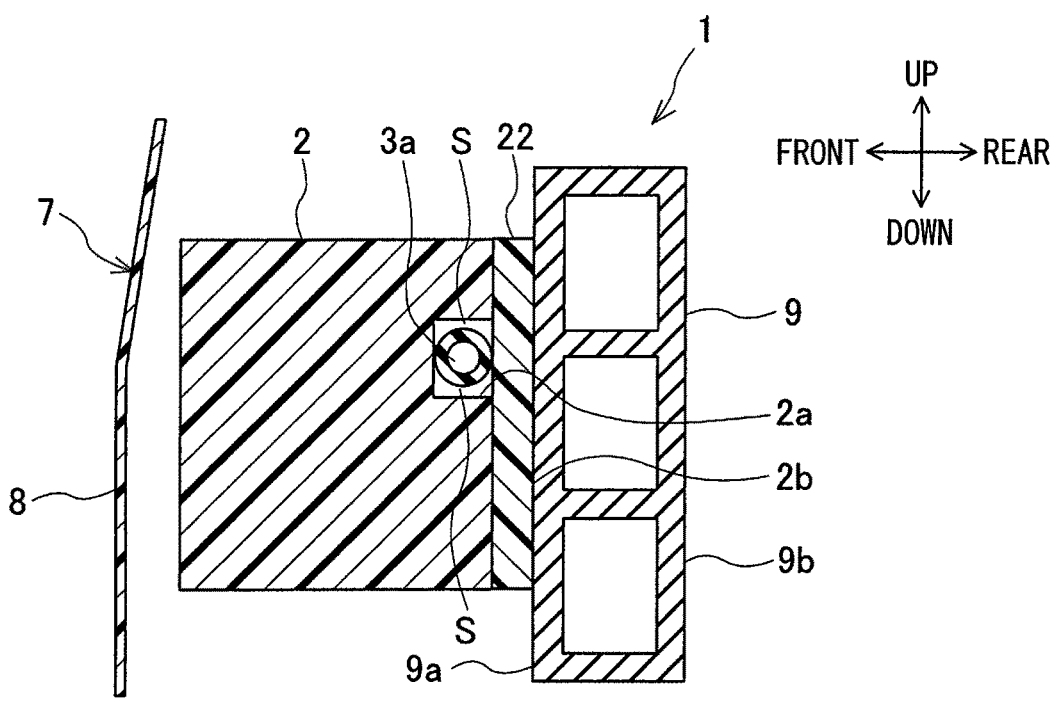
FIG. 12 is a sectional view taken along a line XII-XII in FIG. 10, illustrating that the projection portion is not provided at the holding part.

Similar to FIGS. 5 and 6 of the first embodiment, general parts 20 and the projection parts 22a are provided at the groove portion 2a alternately in the lengthwise direction of the groove portion 2a. In the general part 20, predetermined clearances S are formed between the inner wall surfaces of the groove portion 2a on the vehicle up and down sides, and the detection tube member 3, as illustrated in FIG. 12. The projection parts 22a are arranged at intervals different according to their positions in the vehicle width direction to hold the detection tube member 3 as described above.

Figure 13:
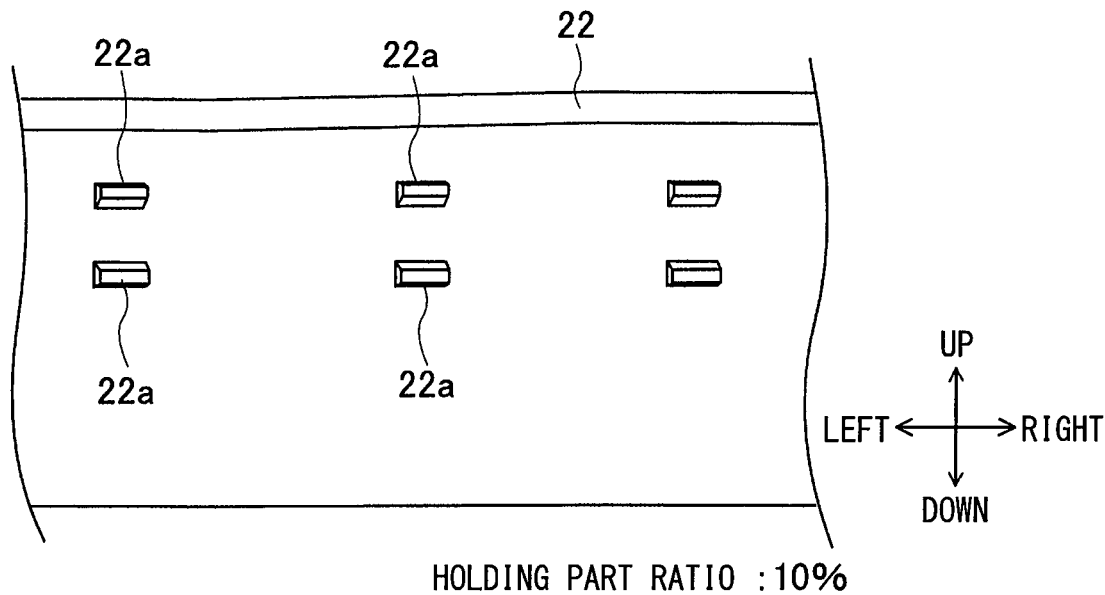
FIG. 13 is a diagram illustrating the holding part placed on a vehicle rear side of a straight part of a groove portion of the second embodiment.

Specifically, the interval between the projection parts 22a, which are arranged at a straight part 2s of the groove portion 2a, is set to be wide as illustrated in FIG. 13. Thus, the holding part ratio, which is a ratio of the part of the detection tube member 3 held by the projection parts 22a to the unit length X of the detection tube member 3, is set to be small. In this case, the holding part ratio at the straight part 2s is set to be approximately 10%.

Figure 14:
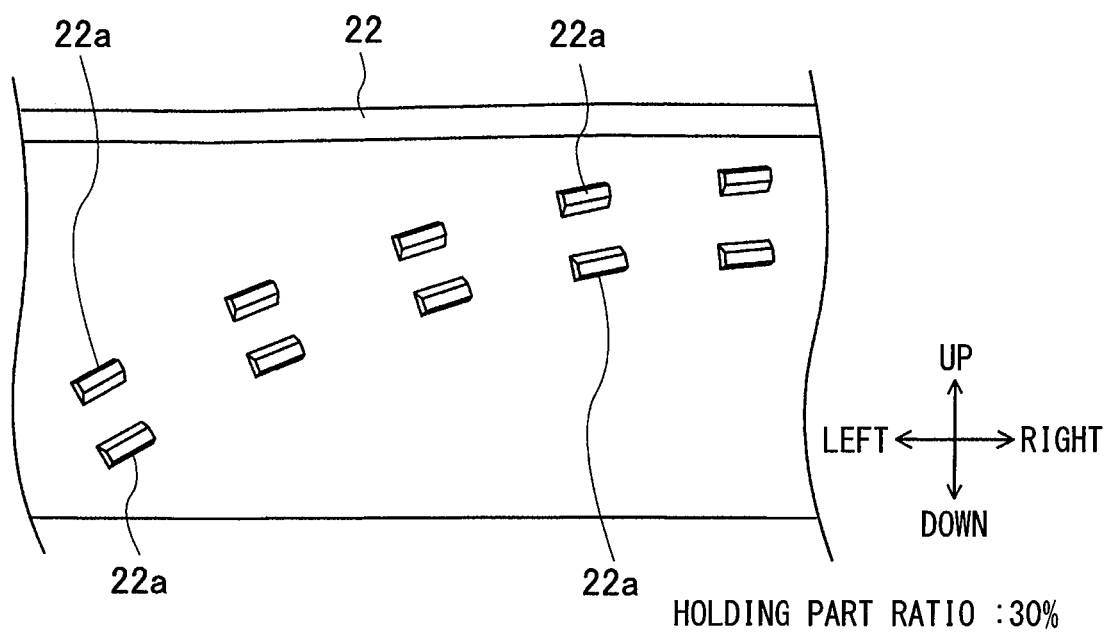
FIG. 14 is a diagram illustrating the holding part placed on a vehicle rear side of a curved part of the groove portion of the second embodiment.

On the other hand, the interval between the projection parts 22a, which are arranged at a curved part 2c of the groove portion 2a, is set to be narrow as illustrated in FIG. 14. Thus, the holding part ratio is set to be large. In this case, the holding part ratio at the curved part 2c is set to be approximately 30%. In this manner, similar to the first embodiment, the holding part ratio of the second embodiment is also set to be higher than the other portions at a front grille end portion G to which a binding hook 12 is attached, and at a corner portion C where a bumper cover 8 on the end portion side in the vehicle width direction is inclined in the vehicle front-rear direction. The holding part ratio is set to be smaller than 40% entirely in the vehicle width direction.

In a collision detection device 1 for a vehicle of the second embodiment described above, the projection part 22a serving as a holding part is a member provided separately from the bumper absorber 2. Specifically, the projection part 22a is a part of the rear surface member 22 that is placed between the bumper absorber 2 and the bumper reinforcement 9 to cover the opening of the groove portion 2a.

This second embodiment can also produce similar effects to the first embodiment. The rear surface member 22 placed between the bumper absorber 2 and the bumper reinforcement 9 to block the opening of the groove portion 2a can reliably prevent foreign substances or the like from entering through the opening of the groove portion 2a. The projection part 22a that is a holding part being a member provided separately from the bumper absorber 2 can eliminate the need to mold the holding part integrally with the bumper absorber 2 to ensure a desired holding strength with a simple configuration using the existing bumper absorber 2.

The pair of projection parts 22a are provided at the rear surface member 22 to be located on the up and down sides with the detection tube member 3 clamped therebetween and to project toward the vehicle front side. In this configuration, the projection parts 22a of the rear surface member 22 holding the detection tube member 3 to clamp the up and down sides of the detection tube member 3 therebetween can stably place the detection tube member 3 at the central part of the groove portion 2a in the up-down direction. This can achieve more reliably both ensuring of pressure characteristics of the collision detection device 1 for a vehicle and ensuring of the holding strength for the detection tube member 3.

Third Embodiment

Figure 15:
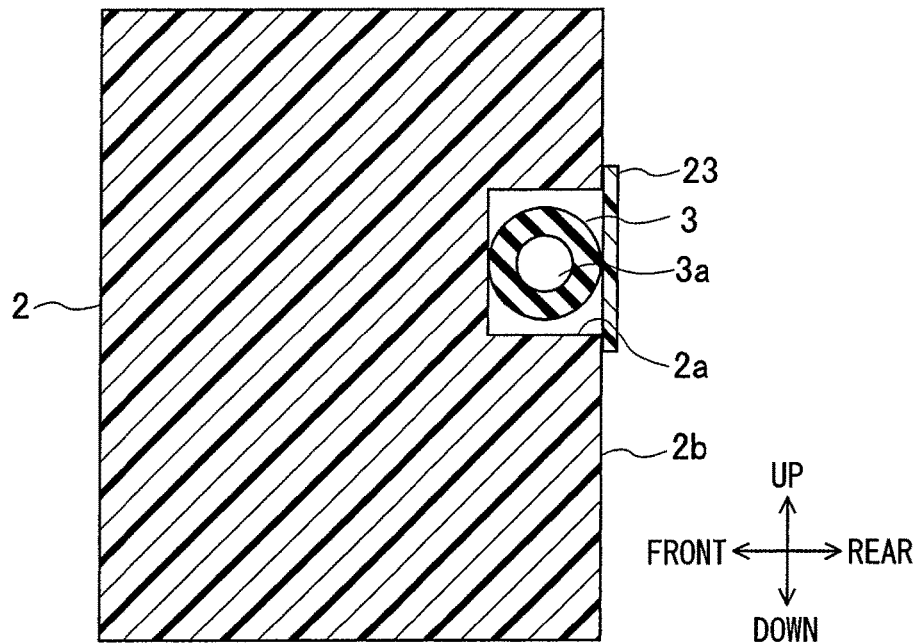
FIG. 15 is a diagram corresponding to FIG. 8 in accordance with a third embodiment.

A third embodiment will be described with reference to FIGS. 15 and 16. To the same part as in the above first embodiment, the same reference numeral is given to omit its description, and only different parts will be explained in FIGS. 15 and 16. In the third embodiment, a holding part 23, which is an adhesive tape, is in contact with the surface of a detection tube member 3 on the vehicle rear side to hold the detection tube member 3 as illustrated in FIG. 15.

Figure 16:
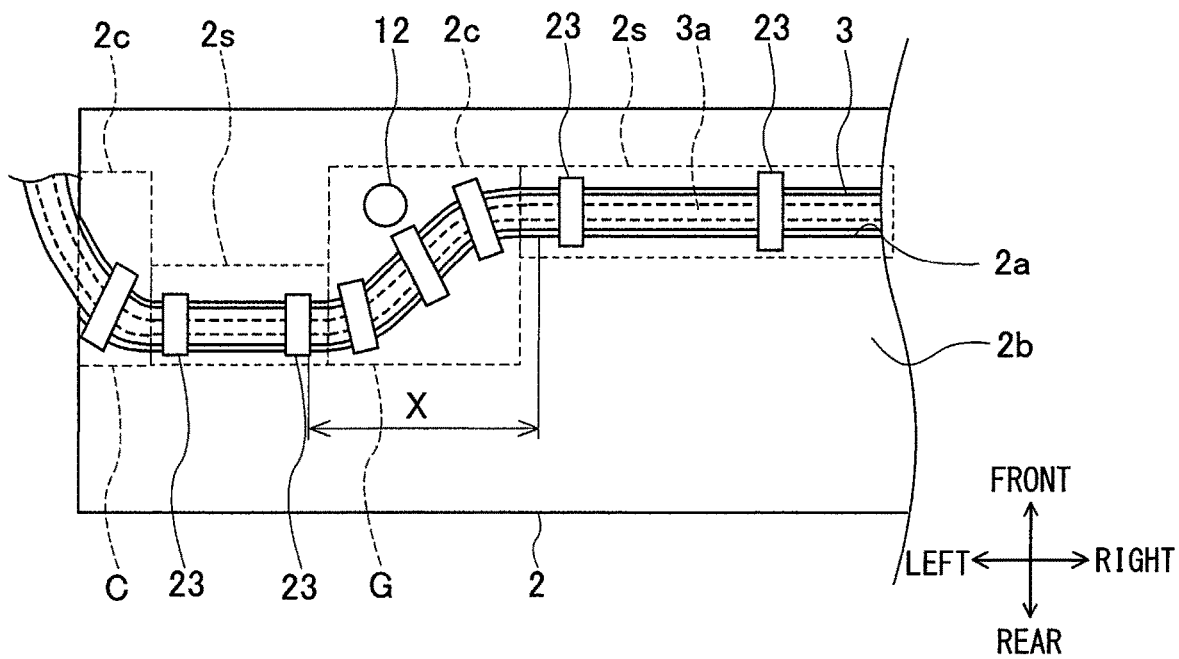
FIG. 16 is a diagram corresponding to FIG. 4 according to the third embodiment.

The holding parts 23 are attached on a rear surface 2b of a groove portion 2a at intervals different according to their position in the vehicle width direction as illustrated in FIG. 16. Specifically, similar to the first embodiment, the interval between the holding parts 23 is narrower than at the other portions at a front grille end portion G and at a corner portion C of a bumper cover 8. Thus, the holding part ratio is set to be higher than at the other portions at the front grille end portion G and at the corner portion C of the bumper cover 8. The holding part ratio is set to be smaller than 40% entirely in the vehicle width direction.

Similar to the first embodiment, general parts 20 and the holding parts 23 are provided at a bumper absorber 2 alternately in the lengthwise direction of the groove portion 2a. In the general part 20, predetermined clearances S are formed between the inner wall surfaces of the groove portion 2a on the vehicle up and down sides, and the detection tube member 3. As described above, the holding part 23 is in contact with the surface of the detection tube member 3 on the vehicle rear side to hold the detection tube member 3.

In a collision detection device 1 for a vehicle of the third embodiment described above, the holding part 23 is a member provided separately from the bumper absorber 2, and is placed on the vehicle rear side of the detection tube member 3. Specifically, the holding part 23 that is an adhesive tape is attached on the rear surface 2b of the groove portion 2a.

This third embodiment can also produce similar effects to the first embodiment. Particularly, only attaching the holding part 23 that is an adhesive tape on the surface of the detection tube member 3 on the vehicle rear side and on the rear surface 2b of the groove portion 2a can hold the detection tube member 3. Thus, the holding part 23 can be placed at a predetermined position by a simple method.

Marks may be put on the outer peripheral surface of the detection tube member 3 or on the rear surface 2b of the bumper absorber 2 beforehand so that the holding parts 23 can be attached at a predetermined holding part ratio.

Fourth Embodiment

Figure 17:
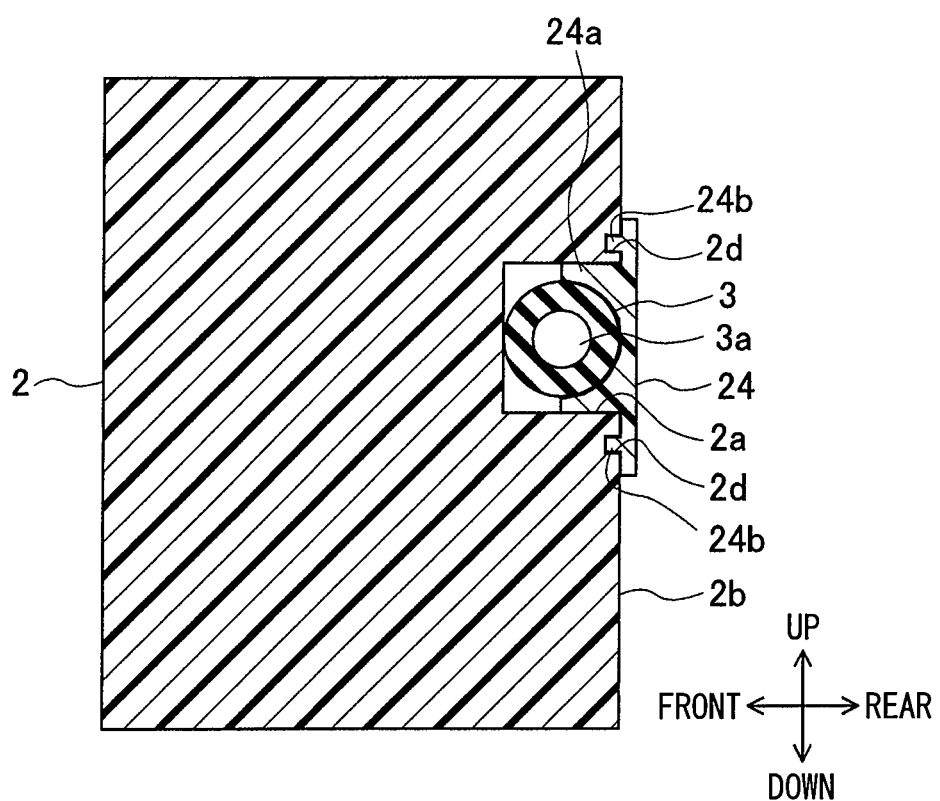
FIG. 17 is a diagram corresponding to FIG. 8 in accordance with a fourth embodiment.

A fourth embodiment will be described with reference to FIG. 17. To the same part as in the above first embodiment, the same reference numeral is given to omit its description, and only different parts will be explained in FIG. 17.

In the fourth embodiment, a holding part 24, which is a clamp body that clamps the outer peripheral surface of a detection tube member 3, holds the detection tube member 3. Specifically, the holding part 24 is a clamp body that covers the outer peripheral surface of the detection tube member 3 on the vehicle rear side, and the holding parts 24 are arranged at intervals in the vehicle width direction. The holding part 24 may have an outer shape that covers the entire circumference of the outer peripheral surface of the detection tube member 3.

The holding part 24 is made of synthetic resin, and includes a projection part 24a that projects toward the vehicle front side. The projection part 24a has a cross-sectional shape of reversed C to conform with the outer peripheral surface of the detection tube member 3 on the vehicle rear side. The holding part 24 may be provided separately from the detection tube member 3, or may be molded integrally with the detection tube member 3. The material of the holding part 24 may be any material as long as it does not interfere with the deformation of the detection tube member 3, and for example, soft resin may be used for the material of the holding part 24.

This holding part 24 includes a pair of fitting projection parts 24*b* on the up and down sides. In addition, fitted recession parts 2*d* that can be fitted respectively to the fitting projection parts 24*b* are provided at a groove portion 2*a*. The fitting projection part 24*b* of the holding part 24 is fitted to the fitted recession part 2*d* of the groove portion 2*a* to fix the detection tube member 3 to a bumper absorber 2.

Although not shown, general parts 20 and the holding parts 24 are arranged at the bumper absorber 2 alternately in the lengthwise direction of the groove portion 2*a*, similar to FIGS. 5 and 6 of the first embodiment. In the so general part 20, predetermined clearances S are formed between the inner wall surfaces of the groove portion 2*a* on the vehicle up and down sides, and the detection tube member 3.

Similar to the third embodiment, the holding parts 24 are arranged on a rear surface 2*b* of the groove portion 2*a* at intervals different according to their position in the vehicle width direction. Specifically, the interval between the adjacent holding parts 24 at a front grille end portion G and at a corner portion C of a bumper cover 8 is narrower than at the other portions. Thus, the holding part ratio is set to be higher than at the other portions at the front grille end portion G and at the corner portion C of the bumper cover 8. The holding part ratio is set to be smaller than 40% entirely in the vehicle width direction.

In a collision detection device 1 for a vehicle of the fourth embodiment described above, the holding part 24 is a member provided separately from the bumper absorber 2, and is placed on the vehicle rear side of the detection tube member 3. Specifically, the holding part 24 is a clamp body that clamps the outer peripheral surface of the detection tube member 3.

This collision detection device 1 for a vehicle of the fourth embodiment can also produce similar effects to the first embodiment. In particular, the holding part 24 being a clamp body that clamps the outer peripheral surface of the detection tube member 3 can more reliably hold the detection tube member 3.

The present disclosure is not limited to the embodiments described above, and can be variously modified or extended without departing from the scope of the disclosure. Modifications to the above embodiments will be described. For example, in the above embodiments, the bumper absorber 2 includes the clearances S in the groove portion 2*a* on both sides of the vehicle up and down sides of the detection tube member 3. Instead of this example, however, the bumper absorber 2 may be configured to include a clearance S only on one side of the vehicle up and down sides of the detection tube member 3.

In the above embodiments, the pressure sensor 4 is attached on the rear surface 9*b* of the bumper reinforcement 9. Instead of this example, however, the arrangement position of the pressure sensor 4 can be changed appropriately. For example, the pressure sensor 4 may be fixed to the inner wall surfaces of the bumper reinforcement 9, or may be fixed to another rigid member.

In the above embodiments, when the effective mass becomes a predetermined threshold value or larger, the collision determination processing determines that the collision with a pedestrian which requires the actuation of the pedestrian protection device 10 has occurred. However, this is not the only example. For example, the pressure value detected by the pressure sensor 4, the pressure change rate, or the like may be used for the threshold value for collision determination.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A collision detection device for a vehicle, comprising:
    a bumper absorber that is placed on a vehicle front side of a bumper reinforcement in a bumper of the vehicle;
    a detection tube member that is attached to a groove portion formed on a rear surface of the bumper absorber along a vehicle width direction and that includes therein a hollow part;
    a pressure sensor that detects a pressure in the hollow part of the detection tube member; and
    a collision detection part that detects a collision of an object with the bumper based on a result of the pressure detection by the pressure sensor, wherein:
    the bumper absorber includes general parts and holding parts alternately in a lengthwise direction of the groove portion;
    in each of the general parts, a predetermined clearance is formed between an inner wall surface of the groove portion on at least one side of vehicle up and down sides, and the detection tube member;
    each of the holding parts is in contact with a surface of the detection tube member on at least one side of vehicle up and down sides, and vehicle front and rear sides to hold the detection tube member; and
    a holding part ratio, which is a ratio of a part of the detection tube member held by the holding parts to a unit length of the detection tube member, is set to be smaller than a predetermined value.

2. The collision detection device according to claim 1, wherein the holding part ratio is set to be smaller than 40%.

3. The collision detection device according to claim 1, wherein a distance between the holding parts is different according to their position in the vehicle width direction.

4. The collision detection device according to claim 1, wherein at a corner portion of the bumper on its end portion side in the vehicle width direction where the bumper is inclined in a vehicle front-rear direction, the holding part ratio is set to be higher than at the other portions.

5. The collision detection device according to claim 1, wherein:
    the groove portion includes a straight part having a straight shape, and a curved part having a curved shape; and
    the holding part ratio at the curved part is set to be higher than at the straight part.

6. The collision detection device according to claim 5, wherein the curved part is bent to avoid a binding hook, which is attached on a front surface of the bumper reinforcement.

7. The collision detection device according to claim 1, wherein the unit length is 300 mm to 400 mm.

8. The collision detection device according to claim 1, wherein the holding parts are molded integrally with the bumper absorber.

9. The collision detection device according to claim 8, wherein each of the holding parts includes a pair of projections that project to be opposed to each other respectively from up and down open ends of the groove portion.

10. The collision detection device according to claim 1, wherein the holding parts are provided separately from the bumper absorber.

11. The collision detection device according to claim 10, wherein the holding parts are part of a rear surface member that is placed between the bumper absorber and the bumper reinforcement to cover an opening of the groove portion.

12. The collision detection device according to claim 11, wherein each of the holding parts includes a pair of projection parts that are provided at the rear surface member to be located on the vehicle up and down sides with the detection tube member clamped therebetween and to project toward the vehicle front side.

13. The collision detection device according to claim 10, wherein each of the holding parts is an adhesive tape.

14. The collision detection device according to claim 10, wherein each of the holding parts is a clamp body that clamps an outer peripheral surface of the detection tube member.

\* \* \* \* \*